(12) United States Patent
Nelson

(10) Patent No.: US 7,944,367 B2
(45) Date of Patent: May 17, 2011

(54) PHASE SIGNAL TRIGGERING HOLD OFF

(75) Inventor: Matthew Allen Nelson, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 373 days.

(21) Appl. No.: 12/246,680

(22) Filed: Oct. 7, 2008

(65) Prior Publication Data

US 2010/0085204 A1    Apr. 8, 2010

(51) Int. Cl.
| | |
|---|---|
| *G08B 21/00* | (2006.01) |
| *B25B 23/145* | (2006.01) |
| *G01H 1/00* | (2006.01) |
| *G01H 9/00* | (2006.01) |
| *G01H 13/00* | (2006.01) |
| *G01L 1/00* | (2006.01) |
| *G01M 7/00* | (2006.01) |
| *G01N 3/32* | (2006.01) |
| *G01N 21/00* | (2006.01) |
| *G01N 24/00* | (2006.01) |
| *G01N 29/00* | (2006.01) |
| *G01N 29/04* | (2006.01) |

(52) U.S. Cl. ..... 340/679; 340/681; 340/683; 340/686.2; 340/686.3; 340/686.5; 173/20; 73/579

(58) Field of Classification Search .......... 340/679, 340/680, 681, 683; 700/174, 182; 173/6, 173/20, 164; 73/609–611, 649, 579, 645–647
See application file for complete search history.

(56) References Cited

U.S. PATENT DOCUMENTS

| | | | | |
|---|---|---|---|---|
| 4,114,454 | A * | 9/1978 | Ernyei et al. | 73/579 |
| 4,484,475 | A * | 11/1984 | Ogura et al. | 73/579 |
| 4,704,693 | A * | 11/1987 | Thomas | 700/176 |
| 4,999,616 | A * | 3/1991 | Martin et al. | 340/674 |
| 5,341,129 | A * | 8/1994 | Wilson et al. | 340/670 |
| 6,212,935 | B1 * | 4/2001 | Shiozaki et al. | 73/9 |
| 6,510,014 | B2 * | 1/2003 | Kikuta et al. | 360/60 |
| 7,337,699 | B2 * | 3/2008 | Newell et al. | 82/112 |
| 2002/0140566 | A1 * | 10/2002 | Holroyd | 340/679 |
| 2010/0219964 | A1 * | 9/2010 | Hunt et al. | 340/668 |

* cited by examiner

*Primary Examiner* — Jennifer Mehmood
(74) *Attorney, Agent, or Firm* — Hoffman Warnick LLC; Ernest G. Cusick

(57) ABSTRACT

A system includes a comparator that triggers a signal indicating an event occurrence of a moving element of a machine that is sensed by a sensor. The signal is triggered in response to a raw signal from the sensor exceeding a trigger level. Logic calculates a hold off time for re-triggering of the signal, and a timer monitors expiration of the hold off time. A trigger screener monitors amplitude of the raw signal and accepts a triggering of the signal from the comparator in response to expiration of the hold off time and the raw signal exceeding a re-trigger level.

20 Claims, 5 Drawing Sheets

PHASE SIGNAL TRIGGERING HOLD OFF

BACKGROUND OF THE INVENTION

The invention relates generally to machine condition monitoring. More particularly, the invention relates to a dynamic triggering hold off for a phase sensor for a moving element of a machine.

In the field of machinery diagnostics and protection, a sensor signal that has an output signal related to the machine speed is required. Typically, the sensor signal is a pulse signal generated once-per-event from a projecting key or a notch on a moving element of the machine such as a rotating shaft. In the case of a rotating shaft, a notch passing the sensor once-per-turn triggers the sensor. The once-per-turn event is useful not only for determining the shaft speed but also to provide a phase reference for comparing against other shaft sensor signals. For example, the phase difference between the phase reference and a radial vibration transducer signal provides an indicator of machine condition.

Circuitry determines when the sensor triggers or, in other words, creates a signal indicative of the tested event, such as a notch on the rotating shaft passing the sensor. As a speed signal and phase reference, it is critical that the circuit that controls triggering of the sensor triggers only once per event. However, ensuring once per event triggering can be difficult due to noise sources such as electrical runout, mechanical runout, inadequate machining of the notch or projection, and overall machine vibration.

FIGS. 1 and 2 show examples of the problem in terms of a rotating shaft. The upper signal (series 1) in each figure is a raw input signal, and the lower signal (series 2) in each figure is the triggered phase signal from a speed or phase sensor. The downward spikes in the raw input signal indicate where the sensor is triggered. As illustrated, there is a large sinusoidal vibration occurring synchronous to the machine speed. The desired triggering in the phase signal is indicated by the downward pulse(s) 10, and is supposed to occur each time the sensor passes over a notch in the rotating shaft. As indicated, there is a significant amount of noise on the raw input signal (indicated by fuzziness of data) which may be caused by, for example, electrical runout on the shaft itself or from other electrical interference. The triggered phase pulses are not occurring at the same frequency as the vibration signal. Note that the triggering problem becomes worse as the phase between the vibration and notch becomes such that the notch occurs at the peak of the vibration. In FIG. 1, the signal is triggering off both the desired event and the vibration noise signal. That is, the noise is creating false triggering (e.g., pulse(es) 12) in the phase signal in FIG. 1. In FIGS. 1 and 2, the phase signal is triggering multiple times from the noise, as indicated by the clumped, multiple downward pulses 14 in the phase signal. Commonly, a triggering error results in an extra pulse as a noise event passes across the triggering level. The trigger level is a signal amplitude of the raw input signal sufficient to indicate an event occurrence.

In previous machine condition monitoring, protection and diagnostics systems, phase pulses have been processed using a trigger level and hysteresis. That is, a system triggers the output phase pulse when the signal crosses the trigger level minus a hysteresis in a negative direction, and then accepts a new trigger only after the raw input signal crosses the threshold plus a hysteresis in the positive direction. While this method works well for signals where the signal-to-noise ratio is good, when the noise is high and the notch or projection is shallow or otherwise defective, it can be difficult to choose an appropriate hysteresis and trigger level to prevent unwanted retriggering. Oscilloscopes have historically provided a hold off time that must pass before a signal will be allowed to re-trigger. However, this hold off time is stagnant and is not calculated or optimized for use on machines having moving elements such as a rotating shaft.

BRIEF DESCRIPTION OF THE INVENTION

A first aspect of the disclosure provides a system comprising: a comparator for triggering a signal indicating an event occurrence of a moving element of a machine in response to a raw signal exceeding a trigger level, the raw signal received from a sensor that senses the event occurrence; and logic including: a hold off time calculator to calculate a hold off time for re-triggering of the signal, a timer that monitors expiration of the hold off time, and a trigger screener that monitors an amplitude of the raw signal and accepts a triggering of the signal from the comparator in response to expiration of the hold off time and the raw signal exceeding a re-trigger level.

A second aspect of the disclosure provides a method comprising: triggering a signal indicating an event occurrence of a moving element of a machine in response to a raw signal exceeding a trigger level, the raw signal received from a sensor that senses the event occurrence; calculating a hold off time for re-triggering of the signal; and monitoring an amplitude of the raw signal and accepting a triggering of the signal in response to expiration of the hold off time and the raw signal exceeding a re-trigger level.

A third aspect of the disclosure is directed to a system comprising: a comparator for triggering a signal indicating a rotation of a rotating shaft of a machine in response to a raw signal exceeding a trigger level, the raw signal received from a sensor that senses the rotation; and logic including: a phase calculator to determine a period between rotations based on the signal from the comparator, a hold off time calculator to calculate a hold off time for re-triggering of the signal, a timer that monitors expiration of the hold off time, a trigger screener that monitors an amplitude of the raw signal and accepts a triggering of the signal from the comparator in response to expiration of the hold off time and the raw signal exceeding a re-trigger level, and a trigger/re-trigger level generator for calculating at least one of the trigger level or the re-trigger level.

DETAILED DESCRIPTION OF THE INVENTION

Figure 1:
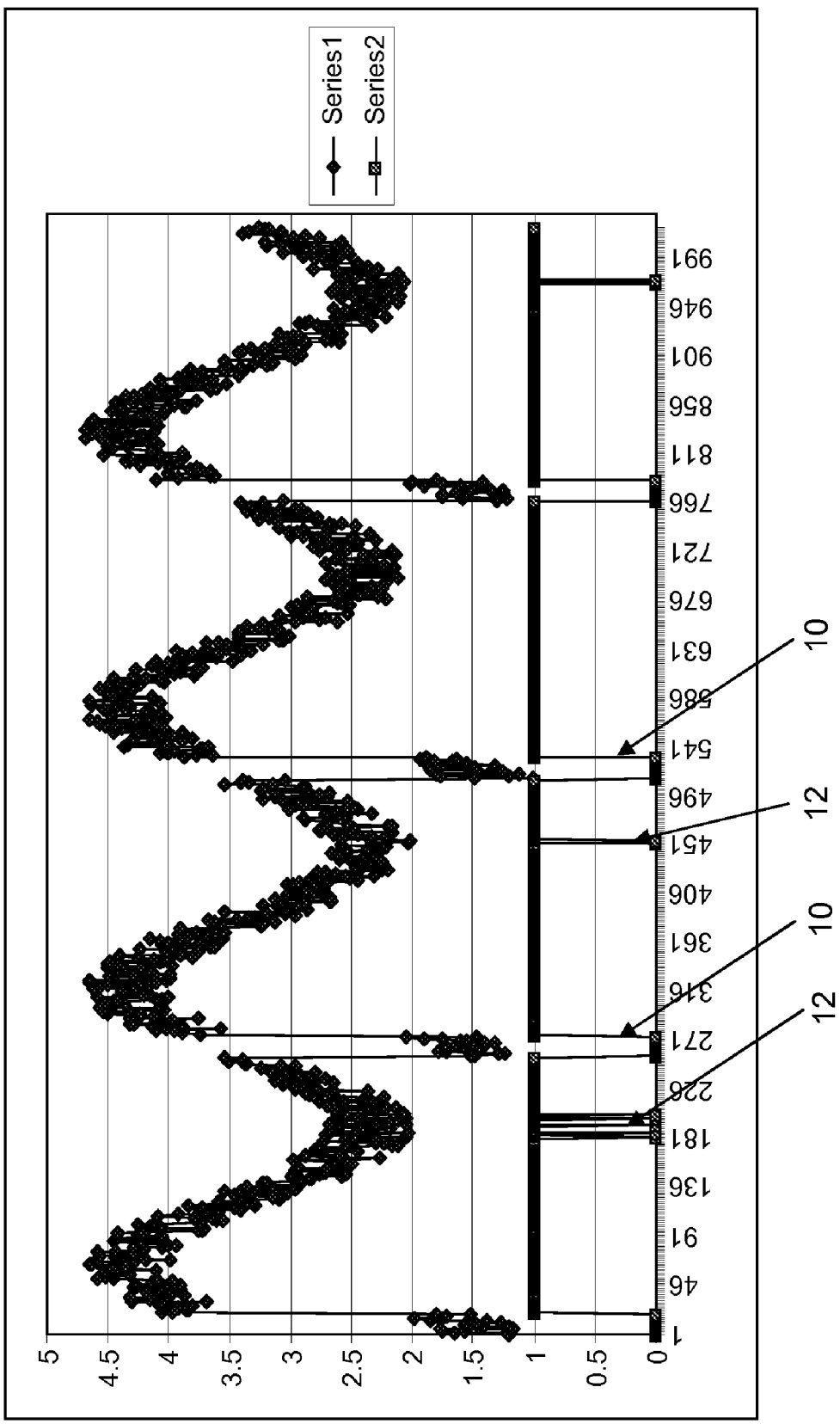
FIGS. 1 and 2 show charts illustrating a raw signal from a sensor and a triggered signal according to the prior art.
Figure 2:
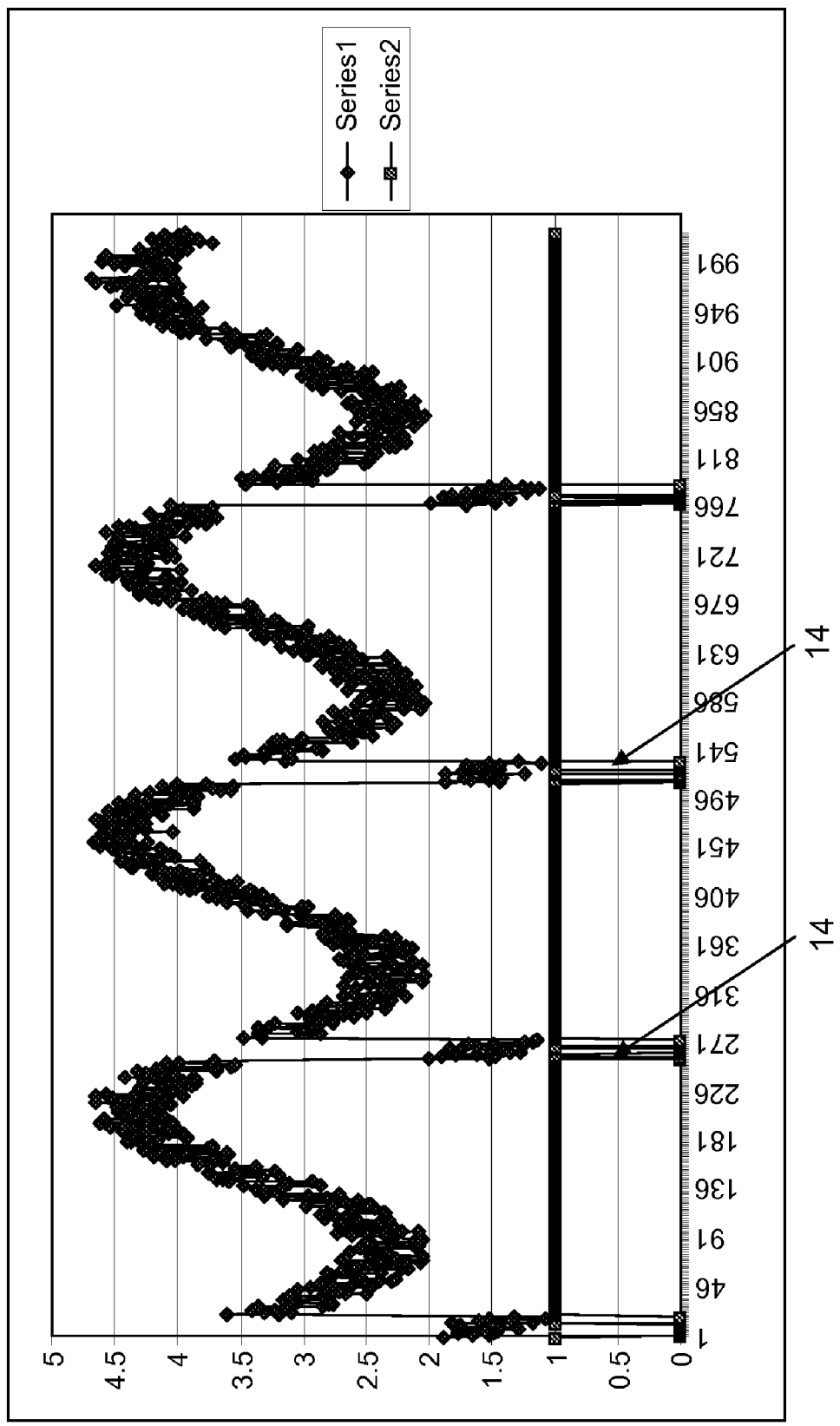
Figure 3:
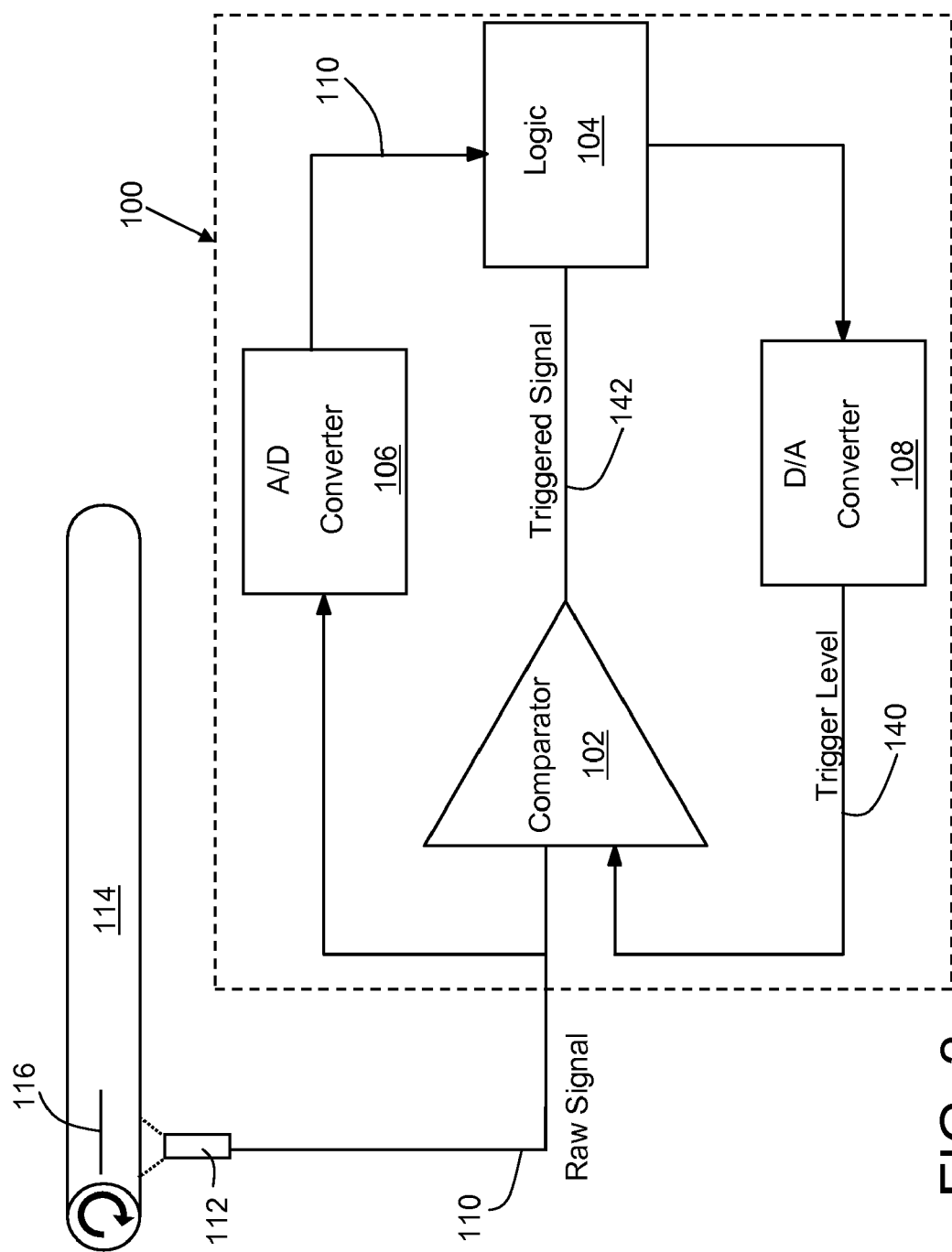
FIG. 3 shows a block diagram of a system for implementing a signal hold off time according to embodiments of the invention.

Referring to the drawings, FIG. 3 shows a block diagram of a system 100 for implementing a phase signal hold off time according to embodiments of the invention. System 100 includes a comparator that triggers a signal indicating an event occurrence of a moving element of a machine that is sensed by a sensor. The signal is triggered in response to a raw signal from the sensor exceeding a trigger level. Logic calculates a hold off time for re-triggering of the signal, and a timer monitors expiration of the hold off time. A trigger screener monitors amplitude of the raw signal and accepts a triggering of the signal from the comparator in response to expiration of the hold off time and the raw signal exceeding a re-trigger level. System 100 provides improved triggering reliability and ease of configuring triggering. For purposes of description, the moving element is illustrated as a rotating shaft; however, it is understood that the teachings of the invention may be applied to practically any moving element regardless of whether it rotates, moves linearly or otherwise.

As shown in FIG. 3, in one embodiment, system 100 includes a comparator 102 and logic 104, and may include an analog-to-digital (A/D) converter 106 and a digital-to-analog (D/A) converter 108. In one embodiment, comparator 102 may include any now known or later developed analog comparator capable of comparing an incoming raw signal 110 from a sensor 112 that senses the event occurrence of a moving element 114 of a machine.

Sensor 112 may include practically any form of sensor that can sense an event occurrence of moving element 114, and may operate on a variety of principals such as eddy current, induction, capacitance and/or optical. As illustrated, sensor 112 operates using optics, e.g., infrared, laser, etc., and senses passing of a position indicator 116, e.g., notch or projection, formed on the rotating shaft. As understood, raw signal 110 may include data regarding sensing of the event occurrence and a variety of noise that makes it difficult to determine whether the event occurrence has occurred.

Figure 4:
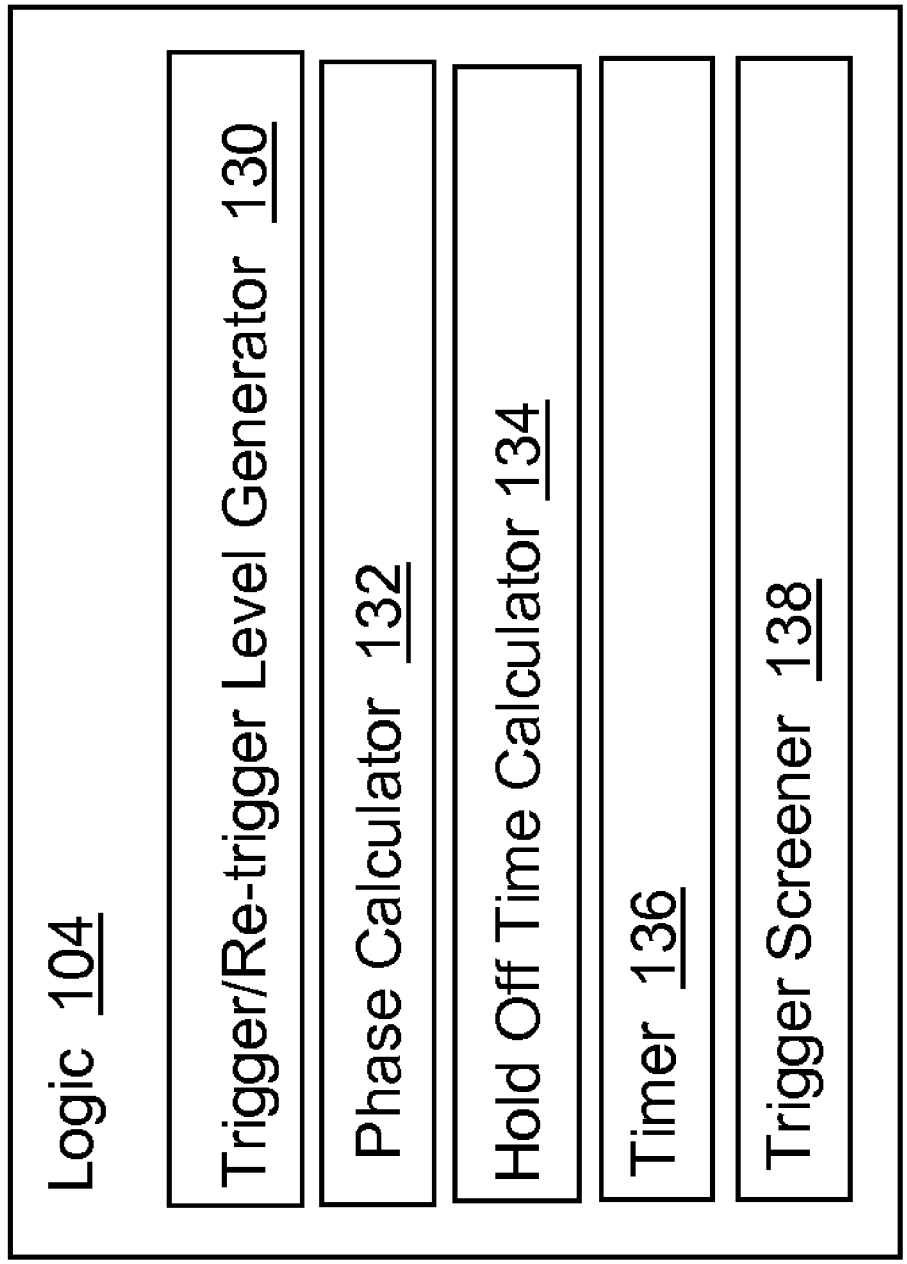
FIG. 4 shows a block diagram illustrating details of the logic of FIG. 3.

Referring to FIG. 4, a block diagram illustrating details of logic 104 is shown. Structurally, logic 104 may take any of a variety of forms such as a field programmable gate array (FPGA), a microprocessor, a digital signal processor, an application specific integrated circuit (ASIC) or any other structure capable of carrying out the functions described herein. Logic 104 may include the following functions: a trigger/re-trigger level generator 130, a speed/phase calculator 132, a hold off time calculator 134, a timer 136 and a trigger screener 138. As will be understood from the description, while logic 104 is illustrated as including each of the above-stated functions, not all of the functions are necessary according to the teachings of the invention as recited in the appended claims.

Figure 5:
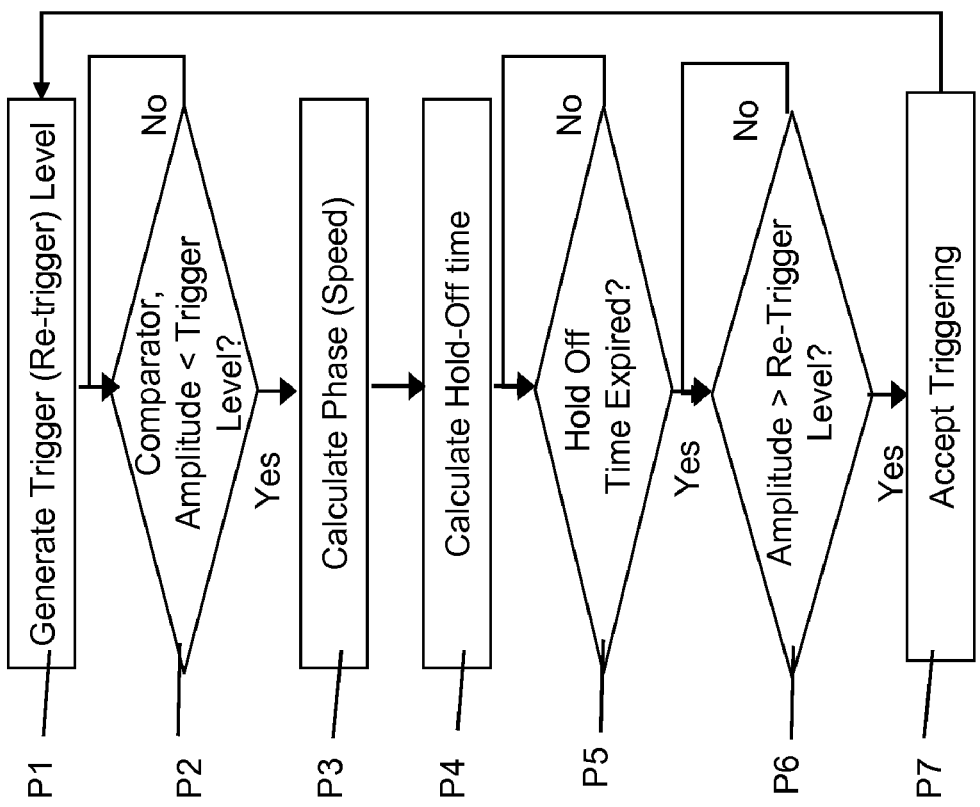
FIG. 5 shows a flow diagram illustrating an operational methodology of the system of FIG. 3 according to embodiments of the invention.

Referring to FIG. 5, a flow diagram illustrating embodiments of an operational methodology of system 100 is shown. The flow diagram of FIG. 5 will be described in conjunction with FIGS. 3 and 4.

In process P1, trigger/re-trigger level generator 130 may generate a trigger level 140. Generator 130 may also generate a re-trigger level (not shown, but used within logic 104), although the values do not have to be simultaneously generated. A 'trigger level' is a signal amplitude of raw signal 110 sufficient to indicate an event occurrence, e.g., a voltage level sufficiently low to indicate sensor 112 sensing position indicator 116 in a sensing field thereof. A 're-trigger level' is a signal amplitude in raw signal 110 sufficient to indicate the passing or end of an event occurrence, e.g., a voltage level sufficiently high to indicate sensor 112 no longer sensing position indicator 116. Process P1 may take a variety of forms. In one embodiment, generator 130 may create trigger level 140 and/or re-trigger level automatically by determining a peak-to-peak range of raw signal 110 and calculating the appropriate values, e.g., a median raw signal peak-to-peak range. In another example, generator 130 may create trigger level 140 and/or re-trigger level based on a user manual selection, e.g., setting one or both to particular voltages. A hysteresis, or part thereof, may also optionally be added or subtracted from the trigger level and re-trigger level, respectively. A hysteresis may be in one application, for example, 0.2-0.25 Volts. As will be understood, process P1 may be omitted, for example, where trigger level 140 and/or the re-trigger level are not repeatedly calculated based on changing data, but simply set to a particular value(s).

In process P2, comparator 102 triggers a signal 142 indicating an event occurrence of moving element 114 in response to raw signal 110 (from sensor 112) exceeding trigger level 140, i.e., 'Yes' at process P2. In order to trigger, raw signal 110 must go below trigger level 140, e.g., a voltage level minus any hysteresis or part thereof. In response to raw signal 110 not exceeding trigger level 140, i.e., 'No' at process P2, comparator 102 continues to monitor raw signal 110. In one embodiment, comparator 102 includes an analog comparator. In this case, comparator 102 may receive trigger level 140 via D/A converter 108, where conversion is necessary. It is understood that the comparator may trigger from either rising or falling signals and the signals may exceed the trigger level in either a positive or negative direction.

In process P3, a phase calculator 132 may determine a (time) period between event occurrences based on triggered signal 142 from comparator 102. Phase calculator 132 may include any now known or later developed function for calculating the period between event occurrences and/or calculating a speed of moving element 114. Process P3, although providing the typical desired output of system 100, does not necessarily have to be performed contemporaneously with every event occurrence, and may be omitted periodically, if desired.

In process P4, hold off time calculator 134 calculates a hold off time for re-triggering of triggered signal 142. In one embodiment, where phase calculator 132 calculates the period between event occurrences, the hold off time may be based on the period. For example, the hold off time may be a percentage of the period. For example, where the period is 5 milliseconds (ms) for one rotation of the rotating shaft, the hold off time may be 52% of the period or 2.6 ms. In another embodiment, hold off time calculator 134 may calculate the hold off time as a percentage of a movement of moving element 114. For example, where moving element 114 includes a rotating shaft, the hold off time may be the time that it takes for the rotating shaft to move a percentage of its full rotation. In another embodiment, hold off time calculator may calculate the hold off time as a percentage of a predicted period of moving element 114 based on a number of previous measured periods, e.g., the previous 2 or more measured periods. In another example, where moving element 114 includes a linearly reciprocating element, the hold off time may be the time that it takes for the reciprocating element to move a percentage of its full stroke. Although particular examples have been described herein, it is understood that the hold off time may be calculated in a variety of different ways within the scope of the invention.

In process P5, timer 136 monitors expiration of the hold off time. In response to the hold off time not expiring, i.e., 'No' at process P5, timer 136 continues to wait; otherwise, i.e., 'Yes' at process P5, processing proceeds to process P6.

In processes P6-P7, trigger screener 138 monitors an amplitude of raw signal 110 (process P6) and accepts a triggering of signal 142 (process P7) from comparator 102 in response to expiration of the hold off time and raw signal 110 exceeding a re-trigger level (P6B). That is, in order for logic 104 to accept a new trigger in signal 142 from comparator 102, the hold off time must expire and raw signal 110 must go above the re-trigger level, e.g., a voltage plus the hysteresis or part thereof. This process reduces the impact of noise within raw signal 110 to create false identifications of an event occurrence by ensuring that an adequate hold off time has expired between triggers in signal 142 (between event occurrences) and that sensor 112 indicates an event occurrence has passed by the re-trigger level being exceeded. As shown in FIG. 3, raw signal 110 may be converted by A/D converter 106, where necessary for input to logic 104.

As noted earlier, although processing is illustrated as returning to process P1 after process P7, it is understood that the return may be to process P2, for example, where the trigger level and/or re-trigger level are not calculated, but simply set to a particular value(s).

The flow diagrams and block diagrams in the drawings illustrate the architecture, functionality, and operation of possible implementations of systems, methods and computer program products according to various embodiments of the present invention. In this regard, each block in the flow diagram or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. For example, rather than providing a separate timer 136, trigger screen 138 may incorporate process P5 therein. It will also be noted that each block of the block diagrams and/or flow diagrams, and combinations of blocks in the block diagrams and/or flow diagrams, can be implemented by special purpose hardware-based systems that perform the specified functions or acts, or combinations of special purpose hardware and computer instructions.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system comprising:
    a comparator for triggering a signal indicating an event occurrence of a rotating element of a machine in response to a raw signal exceeding a trigger level,
    wherein the raw signal is received from a sensor that senses the event occurrence,
    wherein the raw signal includes both data about the event occurrence and noise data; and
    logic including:
        a hold off time calculator to calculate a hold off time for re-triggering of the signal,
        a timer that monitors expiration of the hold off time, and
        a trigger screener that monitors an amplitude of the raw signal and accepts a triggering of the signal from the comparator in response to a combination of:
            expiration of the hold off time; and
            the raw signal exceeding a re-trigger level,
                wherein the re-trigger level represents a signal amplitude in the raw signal indicating the event occurrence has ended.

2. The system of claim 1, wherein the logic further comprises a phase calculator to determine a period between event occurrences based on the signal from the comparator, and
    wherein the hold off time calculator calculates the hold off time based on the period.

3. The system of claim 2, wherein the hold off time is a predetermined percentage of the period.

4. The system of claim 1, wherein the logic further comprises a trigger/re-trigger level generator for calculating at least one of the trigger level or the re-trigger level.

5. The system of claim 1, wherein the comparator includes an analog comparator, and further comprising an analog-to-digital converter for converting the raw signal for input to the logic and a digital-to-analog converter for converting the trigger level for input to the comparator.

6. The system of claim 1, wherein the logic includes one of the group consisting of: a field programmable gate array (FPGA), a microprocessor, a digital signal processor and an application specific integrated circuit (ASIC).

7. The system of claim 1, wherein the rotating element of the machine is a rotating shaft including a position indicator, and the event occurrence includes the position indicator passing the sensor.

8. The system of claim 7, wherein the hold off time is a predetermined percentage of a rotation of the rotating shaft.

9. The system of claim 1, wherein the sensor operates on a principal selected from the group consisting of: eddy current, induction, capacitance and optical.

10. A method comprising:
    triggering a signal indicating an event occurrence of a rotating element of a machine in response to a raw signal exceeding a trigger level,
    wherein the raw signal is received from a sensor that senses the event occurrence;
    wherein the raw signal includes both data about the event occurrence and noise data;
    calculating a hold off time for re-triggering of the signal; and
    monitoring an amplitude of the raw signal and accepting a triggering of the signal in response to a combination of:
        expiration of the hold off time; and
        the raw signal exceeding a re-trigger level,
            wherein the re-trigger level represents a signal amplitude in the raw signal indicating the event occurrence has ended.

11. The method of claim 10, further comprising determining a period between event occurrences based on the signal, and
    wherein the hold off time calculating includes calculating the hold off time based on the period.

12. The method of claim 11, wherein the hold off time is a predetermined percentage of the period.

13. The method of claim 10, further comprising generating at least one of the trigger level or the re-trigger level.

14. The method of claim 10, wherein the rotating element is a rotating shaft including a position indicator, and the event occurrence includes the position indicator passing the sensor.

15. The method of claim 14, wherein the hold off time is a predetermined percentage of a rotation of the rotating shaft.

16. The method of claim 10, wherein the sensor operates on a principal selected from the group consisting of: eddy current, induction, capacitance and optical.

17. A system comprising:
a comparator for triggering a signal indicating a rotation of a rotating shaft of a machine in response to a raw signal exceeding a trigger level,
wherein the raw signal is received from a sensor that senses the rotation,
wherein the raw signal includes both data about the event occurrence and noise data; and
logic including:
a phase calculator to determine a period between rotations based on the signal from the comparator,
a hold off time calculator to calculate a hold off time for re-triggering of the signal,
a timer that monitors expiration of the hold off time,
a trigger screener that monitors an amplitude of the raw signal and accepts a triggering of the signal from the comparator in response to a combination of:
expiration of the hold off time; and
the raw signal exceeding a re-trigger level, and
a trigger/re-trigger level generator for calculating at least one of the trigger level or the re-trigger level,
wherein the re-trigger level represents a signal amplitude in the raw signal indicating the event occurrence has ended.

18. The system of claim 17, wherein the comparator includes an analog comparator, and further comprising an analog-to-digital converter for converting the raw signal for input to the logic and a digital-to-analog converter for converting the trigger level for input to the comparator.

19. The system of claim 17, wherein the hold off time is a percentage of a predicted period of the rotating shaft based on a number of previous measured periods.

20. The system of claim 17, wherein the hold off time is a predetermined percentage of one of the period or a rotation of the rotating shaft.

* * * * *